US010525857B2

(12) United States Patent
   Shiotsu

(10) Patent No.: US 10,525,857 B2
(45) Date of Patent:    Jan. 7, 2020

(54) VEHICLE SEAT

(71) Applicant: TOYOTA BOSHOKU KABUSHIKI KAISHA, Aichi-ken (JP)

(72) Inventor: Tomoyuki Shiotsu, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 113 days.

(21) Appl. No.: 15/202,807

(22) Filed: Jul. 6, 2016

(65) Prior Publication Data
   US 2017/0008433 A1    Jan. 12, 2017

(30) Foreign Application Priority Data
   Jul. 8, 2015 (JP) .................................. 2015-137097

(51) Int. Cl.
   *B60N 2/80*     (2018.01)
   *B60N 2/809*    (2018.01)
   *B60N 2/60*     (2006.01)
   *B60N 2/897*    (2018.01)

(52) U.S. Cl.
   CPC ............. *B60N 2/80* (2018.02); *B60N 2/6009* (2013.01); *B60N 2/809* (2018.02); *B60N 2/897* (2018.02)

(58) Field of Classification Search
   USPC ................. 297/218.1–218.5, 452.48, 452.18
   See application file for complete search history.

(56) References Cited

U.S. PATENT DOCUMENTS

| 4,740,035 | A | * | 4/1988 | Kazaoka | B60N 2/449 297/452.62 |
| 5,252,278 | A |   | 10/1993 | Spann et al. | |
| 5,586,377 | A | * | 12/1996 | Katsuta | B68G 7/05 29/281.3 |

(Continued)

FOREIGN PATENT DOCUMENTS

| CN | 102059965 A | 5/2011 |
| CN | 102910098 A | 2/2013 |

(Continued)

OTHER PUBLICATIONS

JP 2010076634 to Matsumura—Machine Translation—Mar. 31, 2018.*

(Continued)

*Primary Examiner* — David E Allred
(74) *Attorney, Agent, or Firm* — Greenblum & Bernstein, P.L.C.

(57) ABSTRACT

A vehicle seat including a frame-shaped seat frame, a seat pad, a separate member provided to the seat frame, and a seat cover covering the seat pad and the seat frame, wherein the seat pad includes a main body portion configured to be arranged to a seating side of the seat frame and a hooking portion protruding in a direction opposite to the seating side from an edge of the main body portion, wherein at least a portion of the separate member protrudes into the frame shape of the seat frame and is exposed from the hooking portion at a rear side of the seat frame, wherein an extending portion is provided to the hooking portion and protrudes into the frame shape of the seat frame at the rear side of the seat frame, and wherein the extending portion greatly protrudes into the frame shape of the seat frame as compared to the separate member and is arranged between the seat cover and the separate member.

6 Claims, 3 Drawing Sheets

(56) References Cited

U.S. PATENT DOCUMENTS

| | | | | |
|---|---|---|---|---|
| 6,062,645 | A * | 5/2000 | Russell | B60N 2/815 297/410 |
| 6,474,741 | B2 | 11/2002 | Kamida et al. | |
| 2003/0173811 | A1* | 9/2003 | Pausch | B60N 2/838 297/391 |
| 2005/0017554 | A1* | 1/2005 | Mizelle | A47C 4/06 297/218.3 |
| 2006/0087167 | A1* | 4/2006 | Kraft | B60N 2/0232 297/410 |
| 2010/0276978 | A1* | 11/2010 | Furuta | B60N 2/809 297/410 |
| 2010/0301649 | A1 | 12/2010 | Mathews et al. | |
| 2011/0109130 | A1 | 5/2011 | Nakaya et al. | |
| 2013/0033079 | A1 | 2/2013 | Sei et al. | |
| 2013/0049424 | A1 | 2/2013 | Funaki et al. | |
| 2013/0175838 | A1* | 7/2013 | Oshima | B60N 2/4228 297/284.3 |
| 2013/0328375 | A1* | 12/2013 | Zekavica | B60N 2/682 297/452.18 |
| 2014/0375098 | A1 | 12/2014 | Kitou | |
| 2015/0048664 | A1 | 2/2015 | Sano et al. | |
| 2015/0091356 | A1* | 4/2015 | Ozaki | B60N 2/803 297/391 |
| 2015/0091361 | A1 | 4/2015 | Sahashi | |
| 2015/0203001 | A1 | 7/2015 | Akutsa et al. | |
| 2015/0203013 | A1 | 7/2015 | Akutsu et al. | |
| 2017/0368965 | A1* | 12/2017 | Matsushima | B60N 2/68 |
| 2017/0368971 | A1* | 12/2017 | Matsushima | B60N 2/20 |

FOREIGN PATENT DOCUMENTS

| | | |
|---|---|---|
| CN | 104220297 A | 12/2014 |
| CN | 104228640 A | 12/2014 |
| CN | 104602953 A | 5/2015 |
| DE | 4126520 A1 | 2/1993 |
| DE | 19906987 A1 | 8/2000 |
| DE | 10047741 A1 | 4/2002 |
| DE | 10257227 A1 | 7/2004 |
| DE | 102007028052 A1 | 5/2008 |
| DE | 102014219176 A1 | 4/2015 |
| JP | H01-108200 A | 7/1989 |
| JP | H05-074396 A | 10/1993 |
| JP | H07-222645 A | 8/1995 |
| JP | H11-034707 A | 2/1999 |
| JP | 11-78641 | 3/1999 |
| JP | 2002-326551 | 11/2002 |
| JP | 2009-233263 A | 10/2009 |
| JP | 2009-291599 | 12/2009 |
| JP | 2010-076634 A | 4/2010 |
| JP | 2011-10748 A | 1/2011 |
| JP | 2011-218963 A | 11/2011 |
| JP | 2012-148719 A | 8/2012 |
| JP | 2014-008911 A | 1/2014 |
| JP | 2015-003595 A | 1/2015 |
| WO | WO2014/024585 | 2/2014 |
| WO | WO-2017141476 A1 * | 8/2017 ............... B60N 2/58 |

OTHER PUBLICATIONS

Chinese Office Action in corresponding application No. 201610538740.X, dated Jan. 25, 2018 (along with English-language translation thereof).

Chinese Office Action in corresponding Chinese application No. 201610538740.X, dated Oct. 16, 2018 (along with English-language translation thereof).

Japanese Office Action in corresponding Japanese application No. 2015-137097, dated Nov. 13, 2018 (along with English-language translation thereof).

Chinese Office Action in corresponding Chinese application No. 201610538740.X, dated Apr. 29, 2019 (along with English-language translation thereof).

Japanese Office Action in corresponding Japanese application No. 2015-137097, dated Apr. 23, 2019 (along with English-language translation thereof).

German Office Action in corresponding German application No. 102016212222.3, dated Jun. 27, 2019 (along with English-language translation thereof).

Chinese Office Action in corresponding Chinese application No. 201610538740.X, dated Aug. 12, 2019 (along with English-language translation thereof).

* cited by examiner

VEHICLE SEAT

CROSS-REFERENCE TO RELATED APPLICATIONS

This application claims priority from Japanese Patent Application No. 2015-137097 filed on Jul. 8, 2015, the entire contents of which are incorporated herein by reference.

TECHNICAL FIELD

The present disclosure relates to a vehicle seat that includes a frame-shaped seat frame, a seat pad provided to the seat frame and resiliently supporting an occupant, and a separate member provided to the seat frame and protruding into the frame shape of the seat frame.

BACKGROUND

As this kind of vehicle seat, there is known a vehicle seat which includes a seat cushion, a seat back and a headrest (see JP-A-2009-291599). In this vehicle seat, the seat back is erected from a rear portion of the seat cushion and the headrest is provided on an upper portion of the seat back. Further, a pair of headrest stays is protrudingly arranged on a lower portion of the headrest. Each of the pair of headrest stays is a rod-shaped metal member corresponding to the separate member of the present disclosure. Further, the seat back includes a seat frame, a seat pad and a seat cover. The seat frame is a frame body which has a substantially arch shape, as seen in a front view. A pair of cylindrical holders is attached to the upper side of the seat frame and the headrest stays can be inserted into the holders. Further, the seat pad is a member which forms a seat external shape and resiliently supports an occupant. The seat pad is provided on the seating side of the seat frame. Further, the seat cover is a bag-like surface material to cover the seat pad and the seat frame. In the related art, the seat pad is arranged on the seating side of the seat frame, and then, the seat frame and the seat pad are covered with the seat cover. Then, the headrest can be placed on the upper portion of the seat back by inserting the corresponding headrest stay into each holder provided to the seat frame.

In the seat configuration described above, each headrest stay corresponding to the separate member may protrude from a lower end of the holder and be placed within the frame shape of the seat frame. Further, in the related art, the seat pad is arranged on the seating side of the seat frame but is not arranged on the rear side of the seat frame. Therefore, for example, when an occupant presses the seat back from the rear side, the occupant often feels a discomfort such as a sense of foreign matter by being in contact with the headrest stay via the seat cover.

SUMMARY

The present disclosure has been made in consideration of the above-described problem and an object to be solved by an aspect of the present disclosure is to arrange the separate member to protrude into the frame shape of the seat frame while avoiding the occurrence of the discomfort as much as possible.

According to an aspect of the present disclosure, there is provided a vehicle seat including: a frame-shaped seat frame; a seat pad forming a seat external shape and configured to resiliently support an occupant; a separate member provided to the seat frame; and a seat cover covering the seat pad and the seat frame, wherein the seat pad includes a main body portion configured to be arranged to a seating side of the seat frame and a hooking portion protruding in a direction opposite to the seating side from an edge of the main body portion, wherein, in a state where the seat pad is provided to the seat frame, the main body portion is arranged at the seating side of the seat frame and the hooking portion is hooked to the seat frame from an outside of the seat frame, wherein at least a portion of the separate member protrudes into the frame shape of the seat frame and is exposed from the hooking portion at a rear side of the seat frame, wherein an extending portion is provided to the hooking portion and protrudes into the frame shape of the seat frame at the rear side of the seat frame, and wherein the extending portion greatly protrudes into the frame shape of the seat frame as compared to the separate member and is arranged between the seat cover and the separate member.

DETAILED DESCRIPTION

Figure 1:
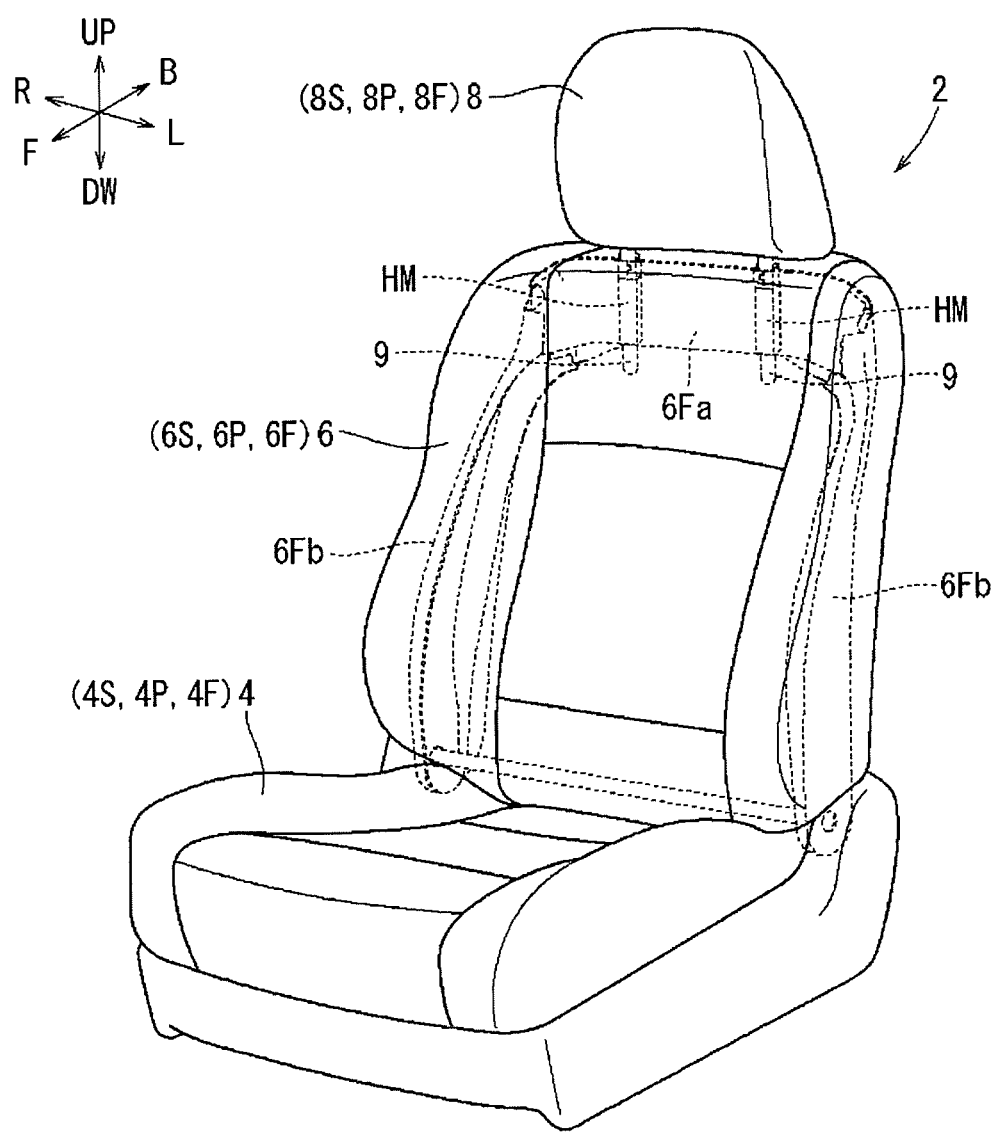
FIG. 1 is a perspective view of a vehicle seat.

Hereinafter, an embodiment for carrying out the present disclosure will be described with reference to FIGS. 1 to 3. In respective drawings, appropriately, the frontward of a vehicle seat is denoted by a symbol "F," the backward (rearward) of the vehicle seat is denoted by a symbol "B," the upward of the vehicle seat is denoted by a symbol "UP," the downward of the vehicle seat is denoted by a symbol "DW," the rightward of the vehicle seat is denoted by a symbol "R" and the leftward of the vehicle seat is denoted by a symbol "L." A vehicle seat 2 shown in FIG. 1 includes a seat cushion 4, a seat back 6 and a headrest 8. These seat components have a seat frame (4F, 6F, 8F) forming a seat framework, a seat pad (4P, 6P, 8P) forming a seat external shape and capable of resiliently supporting an occupant and a seat cover (4S, 6S, 8S) covering the seat pad, respectively.

In the present embodiment, a lower portion of the seat back 6 (to be described later in detail) in an upright state is connected to a rear portion of the seat cushion 4 in such a way that the seat back can be raised or lowered. The headrest 8 is provided on an upper portion of the seat back 6. Then, a pair of headrest stays 9 corresponding to the separate member of the present disclosure is protrudingly provided on a lower portion of the headrest 8. Each of these headrest stays 9 is a rod-shape member having substantially the same shape and dimension. Since it is necessary to secure the mounting stability of the headrest 8, the headrest stays 9 are typically made from a rigid material such as a metal. Here, the headrest 8 may be provided so as to be vertically movable relative to the seat back 6 or may be provided so as not to be vertically movable relative to the seat back 6. The headrest 8 can be vertically moved relative to the seat back 6 by vertically moving the headrest stays 9 relative to a holder HM (to be described later) of the seat back 6 by using a lifting mechanism (not shown) within the vehicle seat, for example.

[Seat Back]

Then, by referring to FIGS. 2 and 3, the seat back 6 includes the above-described basic components 6F, 6P, 6S and a pair of holders HM (details of each part or the like will be appropriately described later). In the present embodiment, the seat pad 6P is arranged on the seat frame 6F and covered with the seat cover 6S, as will be described later. Here, by referring to FIG. 3, the seat cover 6S is a bag-like planar member constituting a seat surface or back surface of the seat back 6. For example, the seat cover 6S can be formed of a fabric (woven fabric, knitted fabric or non-woven fabric) made from natural fibers or synthetic fibers, or leather (natural leather or synthetic leather).

Further, when mounting the headrest 8 on the upper portion of the seat back 6. each headrest stay 9 is inserted into the holder HM provided on the upper portion of the seat frame 6F. At this time, in the present embodiment, each headrest stay 9 is placed inside the frame shape of the seat frame 6F while protruding from a lower end of the corresponding holder HM. In such a configuration, for example, when an occupant is pressed against the seat back 6 from the rear side, there is a concern that the occupant feels a discomfort such as touch with each headrest stay 9 through the seat cover 6S. Therefore, in the present embodiment, each headrest stay 9 is placed so as to protrude into the frame shape of the seat frame 6F while avoiding the occurrence of the discomfort as much as possible. Hereinafter, each configuration will be described in detail.

[Seat Frame]

Figure 2:
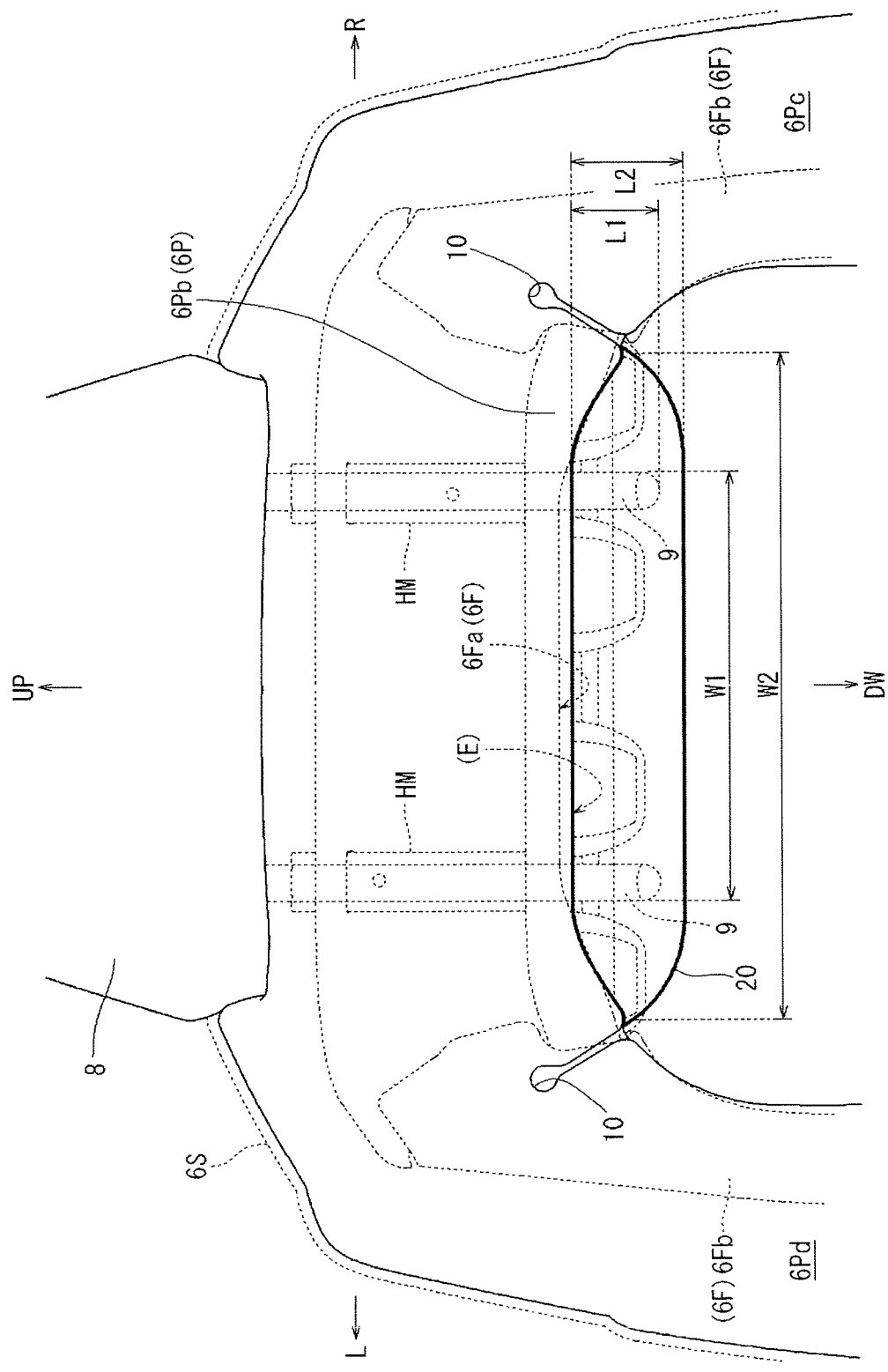
FIG. 2 is a perspective rear view of a portion of the vehicle seat.
Figure 3:
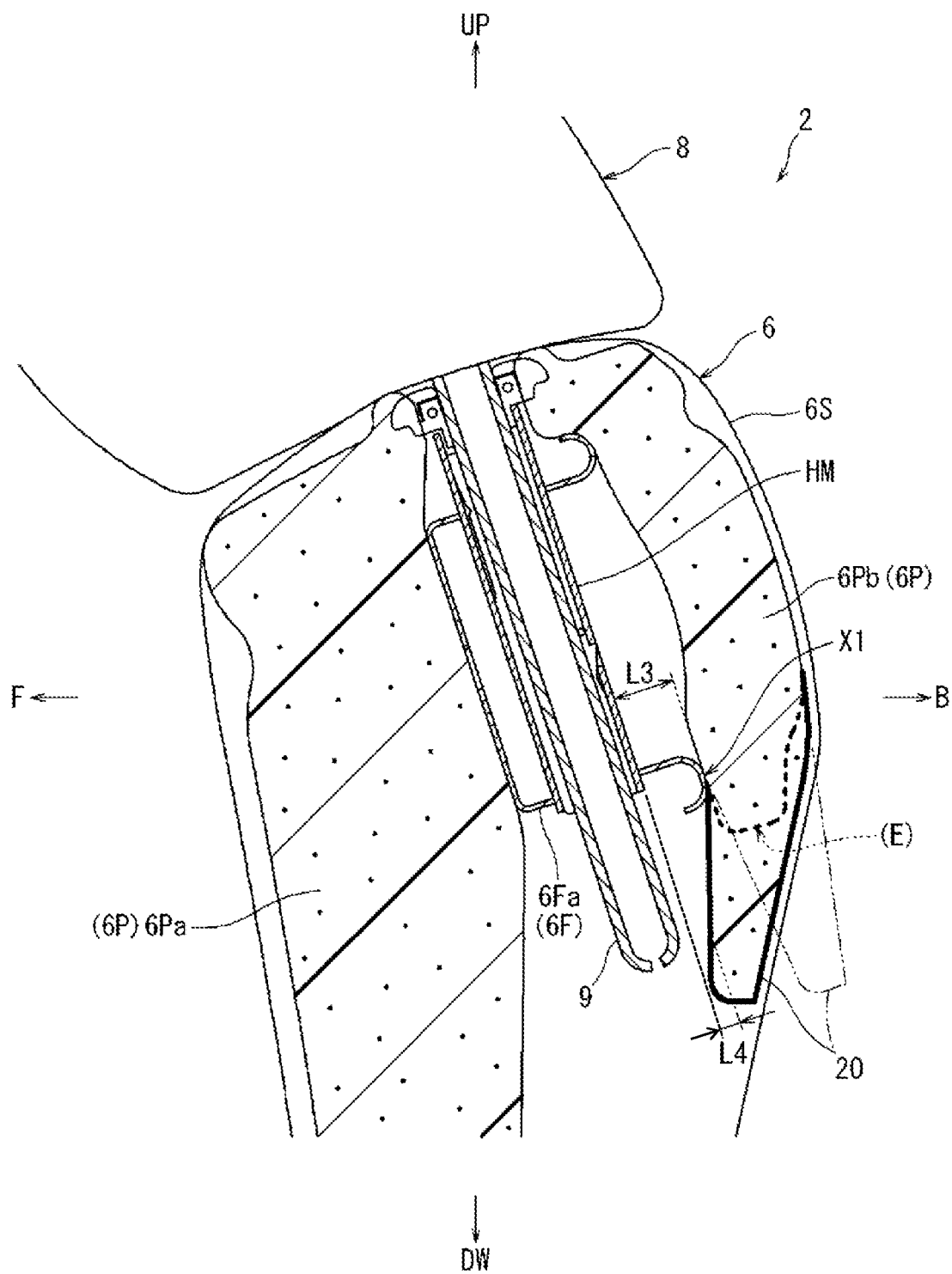
FIG. 3 is a sectional view of a portion of the vehicle seat.

By referring to FIGS. 1 to 3, the seat frame 6F is a frame-shaped metal member which has a substantially arch shape, as seen in a front view. The seat frame 6F includes an upper frame 6Fa, a pair of side frames 6Fb and a pair of holders HM. Each of the pair of side frames 6Fb is a flat plate-shaped member constituting a side framework and is arranged to face each other at the left and right of the seat. Further, the upper frame 6Fa is a box-shaped member constituting an upper framework and having a hat-shaped section. The upper frame 6Fa is arranged on the upper portion of the left and right side frames 6Fb and provided in a bridge shape therebetween. Then, the pair of holders HM is inserted into the upper frame 6Fa so as to have a suitable interval in a seat width direction. Each of the pair of holders HM is a square tube member where ends in a seat up-and-down direction are opened and where the dimension in the seat up-and-down direction is shorter than that of each headrest stay 9. Therefore, by referring to FIG. 2, each headrest stay 9 protrudes downward from a lower end of each holder HM. In this way, each headrest stay 9 is placed to protrude into the frame shape of the seat frame 6F by a protruding length L1, as compared to an upper hooking portion 6Pb (to be described later) of the seat pad 6P.

Here, the arrangement position of each holder HM to the upper frame 6Fa is not particularly limited, so long as the corresponding headrest stay 9 can be inserted into each holder HM. For example, in the present embodiment, by referring to FIG. 2, a spaced dimension between the right surface of the holder HM placed on the right side in the seat width direction and the left surface of the holder HM placed on the left side is set to W1. Further, by referring to FIG. 3, each holder HM is provided at a position which is spaced apart by a spaced dimension L3 in front of the seat from the rear surface of the upper frame 6Fa.

[Seat Pad]

The seat pad 6P is a member capable of resiliently supporting an occupant. By referring to FIGS. 2 and 3, the seat pad 6P includes a main body portion 6Pa, a plurality of hooking portions 6Pb, 6Pc, 6Pd and an extending portion 20 (details of each part will be described later). Here, material of the seat pad 6P is not particularly limited. For example, the seat pad 6P can be formed of a foamed resin such as polyurethane foam (density: 10 kg/m$^3$ to 60 kg/m$^3$). Further, the seat pad 6P of the present embodiment is an integrally molded product. The main body portion 6Pa, respective hooking portions 6Pb to 6Pd and the extending portion 20 are formed of a foamed resin made of the same material and are relatively firmly provided in position of the seat pad 6P. Meanwhile, the rear surface of the seat pad 6P can be covered with a planar backing material (not shown). As the material of the backing material, the material exemplified in the seat cover 6S can be utilized. Preferably, the material of the backing material is a material which is excellent in rigidity, such as felt.

[Main Body Portion/Hooking Portion]

The main body portion 6Pa is a portion which has a substantially rectangular shape, as seen in a front view. By referring to FIG. 3, the main body portion 6Pa can resiliently support the occupant by being placed on the seating side of the seat frame 6F. Further, by referring to FIG. 2, the plurality of hooking portions (6Pb to 6Pd) are portions which are hooked to the seat frame 6F from the outside of the frame in the assemble state (to be described later) of the seat pad 6P. The hooking portions are divided into an upper hooking portion 6Pb and a pair of side hooking portions 6Pc, 6Pd. Here, one side hooking portion 6Pc is a portion protruding toward the rear of the seat from the right edge of the main body portion 6Pa and is hooked to the right side frame 6Fb from the right side thereof. Further, the other side hooking portion 6Pd is a portion protruding toward the rear of the seat from the left edge of the main body portion 6Pa and is hooked to the left side frame 6Fb from the left side thereof.

Then, by referring to FIGS. 2 and 3, the upper hooking portion 6Pb is a portion protruding toward the rear of the seat from the upper edge of the main body portion 6Pa and can be hooked to the upper frame 6Fa (in FIGS. 2 and 3, for the sake of convenience, the extending portion 20 (to be described later) is represented by a bold line in order to distinguish the upper hooking portion 6Pb from the extending portion 20). The upper hooking portion 6Pb is arranged to go around from the upper surface to the rear surface of the upper frame 6Fa. A lower end (E) of the upper hooking portion 6Pb shown in FIG. 3 is placed so as to slightly protrude downward from the upper frame 6Fa at the rear side of the seat. Further, in the present embodiment, by referring to FIG. 2, the upper hooking portion 6Pb is partitioned from the left and right side hooking portions 6Pc, 6Pd by slits 10 provided at both left and right ends of the upper hooking portion 6Pb in the seat width direction. Each slit 10 is a linear groove respectively extending through the seat pad 6P in the thickness direction and extends in the up-and-down direction so as to partition the hooking portions adjacent to each other. The left and right slits 10 allow the upper hooking portion 6Pb to be smoothly deflected together with the extending portion 20 (to be described later) in the seat front-and-rear direction with respect to each side hooking portion 6Pc, 6Pd.

[Extending Portion]

By referring to FIGS. 2 and 3, the extending portion 20 is a portion protruding into the frame shape at the rear side of the seat frame 6F and extends downward from the lower end (E) of the upper hooking portion 6Pb. By referring to FIG. 2, the extending portion 20 forms a substantially inverted trapezoidal shape which is elongated in the seat width direction. The extending portion 20 is provided substantially over the entire width of the upper hooking portion 6Pb. A dimension W2 of the extending portion 20 in the seat width direction is set to be greater than the spaced dimension W1 between the left and right holders HM. Further, a length dimension L2 of the extending portion 20 in the up-and-down direction is set to be greater than the protruding dimension L1 of each headrest stay 9 in the position in which the extending portion 20 can face each headrest stay 9. Therefore, the extending portion 20 greatly protrudes into the frame as compared to each headrest stay 9 while facing each headrest stay 9 in the assembled state of the seat pad 6P, as will be described later. Further, the extending portion 20 has proper flexibility by being formed of a foamed resin. Therefore, the extending portion 20 can be tilted in a direction close to or away from each headrest stay 9 with a contact portion X1 (to be described later) of the upper frame 6Fa and the upper hooking portion 6Pb serving as a base point.

[Operation of Assembling Seat Back]

By referring to FIGS. 2 and 3, the seat pad 6P is assembled to the seat frame 6F. In the present embodiment, the main body portion 6Pa of the seat pad 6P is placed on the seating side of the seat frame 6F and each of the hooking portions 6Pb to 6Pd is hooked to the corresponding portion of the seat frame 6F from the outside of the frame. At this time, by referring to FIG. 3, the upper hooking portion 6Pb is hooked while going around from the upper surface to the rear surface of the upper frame 6Fa, and the lower portion of the upper hooking portion 6Pb and the lower end of the rear surface of the upper frame 6Fa are in contact with each other at the contact portion X1. Meanwhile, the contact portion X1 is arranged at a position spaced by a spaced dimension L3 toward the rear of the seat from each holder HM. In this state, the seat pad 6P and the seat frame 6F are covered with the seat cover 6S, thereby forming the seat surface and the rear surface of the seat back 6.

Now, by referring to FIGS. 2 and 3, a pair of headrest stays 9 is inserted into the corresponding holder HM, so that the headrest 8 is attached to the upper portion of the seat back 6. At this time, in the present embodiment, the lower portion of each headrest stay 9 protrudes from the lower end of each holder HM and is placed inside the frame shape of the seat frame 6F, so that the lower portion is exposed from the lower end (E) of the upper hooking portion 6Pb at the rear side of the seat frame 6F. In this configuration, for example, when an occupant presses the seat back 6 from the rear side, there is a concern that the occupant feels a discomfort such as touch with each headrest stay 9 through the seat cover 6S.

Therefore, in the present embodiment, the extending portion 20 is provided to the upper hooking portion 6Pb and protrudes into the frame shape of the seat frame 6F at the rear side of the seat frame 6F. The extending portion 20 greatly protrudes into the frame shape of the seat frame 6F as compared to each headrest stay 9 and is arranged between the seat cover 6S and each headrest stay 9. That is, in the present embodiment, as shown in FIG. 2, the extending portion 20 is elongated in the seat width direction and arranged in a shape where the extending portion 20 faces both of the pair of headrest stays 9. Then, as shown in FIG. 3, the extending portion 20 greatly protrudes into the frame shape of the seat frame 6F and is arranged between each headrest stay 9 and the seat cover 6S in a seat front-and-rear direction. Therefore, for example, even when an occupant is pressed against the seat back 6 from the rear side, the occupant is first in contact with the resiliently deflectable extending portion 20 through the seat cover 6S. As a result, the occupant is less likely to feel a sense of foreign matter that is caused by hardness of each headrest stay 9, thereby suitably avoiding the occurrence of discomfort.

Furthermore, in the present embodiment, the extending portion 20 is arranged at a position spaced away from each headrest stay 9 in the seat front-and-rear direction that is a seat thickness direction. That is, in the present embodiment, in the assembled state of the seat pad 6P, the extending portion 20 is arranged to be gradually tiled to the rear side of the seat while extending to the lower side of the seat from the lower end of the upper hooking portion 6Pb (see the extending portion as indicated by a two-dot chain line in FIG. 3). Then, when covering the seat pad 6P with the seat cover 6S, the seat cover 6S is gradually pulled to the front side of the seat toward the lower side in the rear side of the seat back 6, and hence, the extending portion 20 is tilted to the front side of the seat with the contact portion X1 serving as a base point (see the extending portion as indicated by a solid line in FIG. 3). At this time, the extending portion 20 inclined forward is arranged at a position spaced away from each holder HM by a spaced dimension L4. In this way, the extending portion 20 and each headrest stay 9 are spaced away from each other and thus prevented from being interfered with each other. Accordingly, the extending portion 20 or the backing material on the rear side thereof can be properly prevented from being damaged due to the contact with each headrest stay 9. At this time, the extending portion 20 is in a posture of being tilted forward and is close to each headrest stay 9, so that it is possible to more reliably avoid the occupant directly contacting with each headrest stay 9 through the seat cover 6S. For example, in the present embodiment, the spaced dimension L4 between the extending portion 20 and the holder HM can be set to be smaller than the spaced dimension L3 between the contact portion X1 and the holder HM in the seat front-and-rear direction. Further, when each headrest stay 9 is vertically moved with respect to the holder HM by a lifting mechanism, each headrest stay 9 can be relatively moved without being hindered by the extending portion 20 as much as possible.

As described above, in the present embodiment, the extending portion 20 of the seat pad 6P greatly protrudes into the frame shape of the seat frame 6F and is thus placed between the seat cover 6S and each headrest stay 9. Therefore, for example, when the seat back 6 is pressed from the rear surface, it is possible to reliably avoid the occupant directly contacting with each headrest stay 9 through the seat cover 6S. At this time, by tilting the extending portion 20 so as to come close to each headrest stay 9, it is possible to more reliably avoid an occupant directly contacting with each headrest stay 9 through the seat cover 6S. Further, in the present embodiment, the main body portion 6Pa, the hooking portions 6Pb to 6Pd and the extending portion 20 are formed of a resin made of the same material. Therefore, each portion can be relatively firmly provided in the seat pad 6P by using a simple method such as an integral molding. Further, in the present embodiment, the extending portion 20 and each headrest stay 9 are spaced away from each other and thus prevented from being interfered with each other. Therefore, the extending portion 20 can be properly prevented from being damaged due to the contact with each headrest stay 9. As a result, according to the present embodiment, each headrest stay 9 can be arranged to protrude into the frame shape of the seat frame 6F while avoiding the occurrence of the discomfort as much as possible.

Furthermore, in the present embodiment, each headrest stay 9 may be moved relative to the seat frame 6F. Also in this case, the extending portion 20 and each headrest stay 9 are spaced away from each other, and thus, each headrest stay 9 can be relatively moved without being hindered by the extending portion 20 as much as possible. Further, when each headrest stay 9 is moved relative to the seat frame 6F, the extending portion 20 is tilted to the rear side of the seat and thus further spaced away from each headrest stay 9. In this way, each headrest stay 9 can be smoothly moved relative to the seat frame 6F.

The vehicle seat of the present embodiment is not limited to the above-described embodiment but may take other various embodiments. In the present embodiment, the configuration (shape, dimension, formation position and the number of formation, etc.) of the extending portion 20 has been exemplified. However, this is not intended to limit the configuration of the extending portion. For example, a plurality of extending portions may be provided in accordance with the number of arrangement of the headrest stay as the separate member. In this case, each extending portion is arranged between each headrest stay and the seat cover. Further, the extending portion may be arranged in contact with the headrest stay or may be provided to the hooking portion so as not to be tilted. Further, depending on the arrangement position of the separate member, the extending portion can be provided to an appropriate position of the seat pad and can be provided also to the side hooking portions other than the upper hooking portion. For example, the extending portion may be provided to the side hooking portions and extend toward a seat width direction.

Further, in the present embodiment, the configuration (shape, dimension, material and constituting part, etc.) of the seat pad 6P has been exemplified. However, this is not intended to limit the configuration of the seat pad. For example, the main body portion 6Pa, the hooking portions 6Pb to 6Pd and the extending portion 20 may be separately formed and then integrated. In this case, respective parts are formed of a resin made of the same material and are easily combined. Therefore, respective parts can be relatively firmly integrated by a simple method such as an adhesion or fusion. Further, the main body portion, the hooking portion and the extending portion may be formed of a resin made of the same material or may be formed of a resin made of different materials. Meanwhile, the extending portion may be formed of various materials softer than the headrest stay. For example, the extending portion may be formed of elastomer or rubber other than the resin. Further, at least one hooking portion may be formed in the seat pad and hooked to the seat frame.

Further, in the present embodiment, the seat back 6 has been described just as an example. However, the configuration of the present embodiment can be applied to various seat components such as the seat cushion 4. Further, the configuration of the seat frame can be properly modified. For example, a pipe-shaped member or a flat plate-shaped member may be used as the upper frame. Further, in addition to the headrest stay, various members such as a sensor, a motor or a bracket can be exemplified as the separate member. Further, the configuration of the present embodiment is applicable to the seats of general vehicles such as automobiles, airplanes or trains.

What is claimed is:

1. A vehicle seat comprising:
    a frame-shaped seat frame;
    a seat pad forming a seat external shape and configured to resiliently support an occupant;
    a separate member provided to the seat frame;
    a holder provided on the seat frame and arranged for accommodating the separate member; and
    a seat cover covering the seat pad and the seat frame,
    wherein the seat pad includes a main body portion configured to be arranged to a seating side of the seat frame and a hooking portion protruding in a direction opposite to the seating side from an edge of the main body portion,
    wherein, in a state where the seat pad is provided to the seat frame, the main body portion is arranged at the seating side of the seat frame and the hooking portion is hooked to the seat frame from an outside of the seat frame,
    wherein a first portion of the hooking portion comes into contact with the seat frame at a first contact portion,
    wherein a second portion of the hooking portion comes into contact with the seat frame at a second contact portion,
    wherein the first portion of the hooking portion is located at an upper side relative to a center, in a longitudinal direction of the holder, of the hooking portion, and the second portion of the hooking portion is located at a lower side relative to the center, in the longitudinal direction of the holder, of the hooking portion,
    wherein at least a portion of the separate member protrudes into the frame shape of the seat frame and is exposed from the hooking portion at a rear side of the seat frame,
    wherein an extending portion is provided to the hooking portion and protrudes into the frame shape of the seat frame at the rear side of the seat frame,
    wherein the extending portion protrudes into the frame shape of the seat frame to a greater degree as compared to the separate member and is arranged between the seat cover and the separate member, and
    wherein, in a state where the hooking portion and the seat frame come into contact with each other, in a direction perpendicular to a longitudinal direction of the holder, a first spaced dimension between the extending portion and a plane through a rearmost surface of the holder is smaller than a second spaced dimension between the plane through the rearmost surface of the holder and the second contact portion, the second contact portion being arranged between the hooking portion and the seat frame,
    the vehicle seat further comprising a first frame extension portion attached to and extending perpendicularly from an upper end of the holder, and a second frame extension portion attached to and extending perpendicularly from a lower end of the holder,
    wherein the first contact portion and the second contact portion are respectively defined by the first frame extension portion and the second frame extension portion,
    wherein the hooking portion is in contact with the second frame extension portion at the second contact portion,
    wherein the hooking portion includes an edge that defines a rearward facing opening in the seat pad and slits extending lengthwise transverse to the edge and open out through the edge at both left and right ends of the hooking portion in a seat width direction, and
    wherein the slits are linear grooves extending through the seat pad in a thickness direction thereof and wherein the extending portion protrudes into the frame shape to a greater degree than the slits.

2. The vehicle seat according to claim 1,
    wherein the main body portion, the hooking portion and the extending portion are formed of a resin made of the same material.

3. The vehicle seat according to claim 1,
    wherein, in the state where the seat pad is provided to the seat frame, the extending portion is placed to be spaced away from the separate member and to face the separate member in a seat thickness direction.

4. The vehicle seat according to claim 1,
wherein the hooking portion is arranged in contact with the seat frame at the rear side of the seat frame and the extending portion is configured to be tilted in a direction close to or away from the separate member with the contact portion of the seat frame and the hooking portion serving as a base point.

5. The vehicle seat according to claim 4,
wherein the hooking portion is longer than the extending portion.

6. A vehicle seat comprising:
a frame-shaped seat frame;
a seat pad forming a seat external shape and configured to resiliently support an occupant;
a separate member provided to the seat frame;
a holder provided on the seat frame and arranged for accommodating the separate member;
a seat cover covering the seat pad and the seat frame, and
a frame extension portion, the frame extension portion including a first frame extension portion attached to and extending perpendicularly from an upper end of the holder, and a second frame extension portion attached to and extending perpendicularly from a lower end of the holder,
wherein the seat pad includes a main body portion configured to be arranged to a seating side of the seat frame and a hooking portion protruding in a direction opposite to the seating side from an edge of the main body portion,
wherein, in a state where the seat pad is provided to the seat frame, the main body portion is arranged at the seating side of the seat frame and the hooking portion is hooked to the seat frame from an outside of the seat frame,
wherein a first portion of the hooking portion comes into contact with the seat frame at a first contact portion,
wherein a second portion of the hooking portion comes into contact with the seat frame at a second contact portion,
wherein the first portion of the hooking portion is located at an upper side relative to a center, in a longitudinal direction of the holder, of the hooking portion, and the second portion of the hooking portion is located at a lower side relative to the center, in the longitudinal direction of the holder, of the hooking portion,
wherein at least a portion of the separate member protrudes into the frame shape of the seat frame and is exposed from the hooking portion at a rear side of the seat frame,
wherein an extending portion is provided to the hooking portion and protrudes into the frame shape of the seat frame at the rear side of the seat frame,
wherein the extending portion protrudes into the frame shape of the seat frame to a greater degree as compared to the separate member and is arranged between the seat cover and the separate member,
wherein the first contact portion and the second contact portion are respectively defined by the first frame extension portion and the second frame extension portion,
wherein the hooking portion is in contact with the second frame extension portion at the second contact portion,
wherein the hooking portion includes an edge that defines a rearward facing opening in the seat pad and slits extending lengthwise transverse to the edge and open out through the edge at both left and right ends of the hooking portion in a seat width direction, and
wherein the slits are linear grooves extending through the seat pad in a thickness direction thereof and wherein the extending portion protrudes into the frame shape to a greater degree than the slits.

* * * * *